(12) United States Patent
Fukuzato

(10) Patent No.: US 9,107,024 B2
(45) Date of Patent: Aug. 11, 2015

(54) COMMUNICATION SYSTEM, INFORMATION PROCESSING APPARATUS, MOBILE TERMINAL, AND INPUT METHOD

(71) Applicant: NEC CASIO MOBILE COMMUNICATIONS, LTD., Kawasaki-shi, Kanagawa (JP)

(72) Inventor: Atsushi Fukuzato, Kanagawa (JP)

(73) Assignee: NEC MOBILE COMMUNICATIONS, LTD., Kanagawa (JP)

( * ) Notice: Subject to any disclaimer, the term of this patent is extended or adjusted under 35 U.S.C. 154(b) by 174 days.

(21) Appl. No.: 13/648,771

(22) Filed: Oct. 10, 2012

(65) Prior Publication Data

US 2014/0099937 A1    Apr. 10, 2014

(51) Int. Cl.
*H04M 3/00* (2006.01)
*H04W 4/00* (2009.01)
*G06F 9/445* (2006.01)
*G06F 9/455* (2006.01)

(52) U.S. Cl.
CPC ............. *H04W 4/00* (2013.01); *G06F 9/44521* (2013.01); *H04W 4/003* (2013.01); *G06F 9/45504* (2013.01)

(58) Field of Classification Search
CPC .......... G06F 3/044; G06F 2203/04111; G06F 3/0416; G06F 17/5022; G06F 3/03547; G06F 3/038; G06F 17/30905; G06F 17/5036; G06F 1/1626; G06F 1/1628; G06F 1/1632; G06F 3/04845; G06F 29/06027; G06F 9/4421; G06F 9/45504; H04W 4/18; H04W 4/00; H04W 4/003; H04W 88/02; H04M 1/72533
USPC .......... 455/420, 566, 412.1; 345/156; 703/24, 703/206, 213; 370/310
See application file for complete search history.

(56) References Cited

U.S. PATENT DOCUMENTS

| | | | | |
|---|---|---|---|---|
| 6,978,294 | B1 * | 12/2005 | Adams et al. | 709/217 |
| 8,584,040 | B2 * | 11/2013 | Saito et al. | 715/810 |
| 2001/0014881 | A1 * | 8/2001 | Drummond et al. | 705/43 |
| 2013/0030786 | A1 * | 1/2013 | Halim et al. | 703/24 |
| 2013/0054010 | A1 * | 2/2013 | Holman et al. | 700/232 |
| 2013/0162515 | A1 * | 6/2013 | Prociw et al. | 345/156 |

FOREIGN PATENT DOCUMENTS

JP    2005-202770 A    7/2005

* cited by examiner

*Primary Examiner* — Mahendra Patel
(74) *Attorney, Agent, or Firm* — Sughrue Mion, PLLC

(57) ABSTRACT

A device control middleware 130 in a mobile terminal 10 converts ability information and input information (for example, pressing of a key) of various input devices of the mobile terminal 10 into an analyzable form, and transmits the converted information to a PC 20. A virtual device middleware 230 in the PC 20 analyzes the information received from the device control middleware 130 and supplies the information extracted by the analysis as input information of a JAVA application 250.

8 Claims, 6 Drawing Sheets

```
modular type: B706
MAC address: 00-25-E1-04-99-9C available input device: key, acceleration sensor
using device: key, acceleration sensor device information: key (0, 1, 2, 3, 4, 5, 6, 7, 8, 9, *, #)

input information: key ("9", 2010/09/11 20:01:34 - 20:01:39, pressed)
```

Fig. 3

COMMUNICATION SYSTEM, INFORMATION PROCESSING APPARATUS, MOBILE TERMINAL, AND INPUT METHOD

INCORPORATION BY REFERENCE

This application is based upon Japanese patent application No. 2010-215451, filed on Sep. 27, 2010, the disclosure of which is incorporated herein in its entirety by reference.

BACKGROUND OF THE INVENTION

1. Technical Field

The present invention relates to a communication system, an information processing apparatus, a mobile terminal, and an input method.

2. Background Art

In recent years, applications including JAVA® applications have been in widespread use on mobile terminals including mobile phones. Applications are generally executed on mobile phones not only for a short-time use, such as path search or so-called "kill time", but also for a long-time use.

Typical mobile terminals have a small display unit such as a liquid crystal display. Accordingly, when a user operates an application for a long period of time, the operability of the application is insufficient in many cases. Particularly, in the case of executing an application for a fighting game to be played with another user, or executing a wellness application, for example, it is necessary for the user to perform detailed operations while viewing a small screen. Thus, the operability is insufficient.

In addition, many users mainly use a mobile terminal and rarely use a personal computer or the like. Such users desire to view a large screen while ensuring the operational feeling of a mobile terminal.

Japanese Unexamined Patent Application Publication No. 2005-202770 discloses a technique for a personal computer control system using a mobile phone and capable of simply realizing a ubiquitous environment. In this personal computer control system, functions (for example, an e-mail function) of a mobile phone are transferred to a personal computer, thereby enabling operation using a large display and input devices of the personal computer.

However, the technique disclosed in Japanese Unexamined Patent Application Publication No. 2005-202770 described above has a problem that the operability for the user is still insufficient. The problem will be described in detail below.

Japanese Unexamined Patent Application Publication No. 2005-202770 assumes that display information is displayed on a large display of a personal computer and that a keyboard, a mouse, and the like, which are installed in the personal computer, are used as input devices. As described above, however, many users rarely use a personal computer or the like, but mainly use a mobile terminal to execute an application. Accordingly, there is a problem that such users cannot use a user-friendly input unit to execute an application, which results in low user-friendliness. There is another problem that such users cannot use input units included only in mobile terminals.

SUMMARY

The present invention has been made to solve the above-mentioned problems, and it is a main object of the present invention to provide a communication system, an information processing apparatus, a mobile terminal, and an input method, which are capable of executing an application on a mobile terminal by using an input unit that can be easily used by a user.

In a first exemplary aspect of the present invention, a communication system includes: a mobile terminal including at least one first input device through which a user performs a given input; and an information processing apparatus that executes a given application and displays an execution state of the application on a display device, the information processing apparatus being connected or integrated with the display device. The mobile terminal includes a device control middleware unit that transmits, to the information processing apparatus, ability information of the first input device and an input from the first input device. The information processing apparatus includes a virtual device control middleware unit that emulates the information received from the device control middleware unit as an input to the application.

In a second exemplary aspect of the present invention, an information processing apparatus executes a given application and displays an execution state of the application on a display device, the information processing apparatus being connected or integrated with the display device, the information processing apparatus being configured to: receive ability information of a first input device and an input from the first input device, as an operation instruction for the application, the first input device being connected or integrated with a mobile terminal; and emulate the received information as an input to the application.

In a third exemplary aspect of the present invention, a mobile terminal at least one first input device through which a user performs a given input, the mobile terminal being configured to execute a given application and to transmit, to an information processing apparatus, ability information of the first input device and an input from the first input device, as an operation instruction for the application, the information processing apparatus being configured to display an execution state of the application on a display device.

In a fourth exemplary aspect of the present invention, there is provided an input method for inputting an operation instruction to an application in a communication system including: a mobile terminal including at least one first input device through which a user performs a given input; and an information processing apparatus that executes a given application and displays an execution state of the application on a display device, the information processing apparatus being connected or integrated with the display device, the method including: transmitting, by the mobile terminal, ability information of the first input device and an input from the first input device, to the information processing apparatus; and emulating, by the information processing apparatus, the ability information of the first input device and the input from the first input device, as an input to the application, the ability information and the input being received from the mobile terminal.

BRIEF DESCRIPTION OF THE DRAWINGS

The above and other objects, features and advantages of the present invention will become more fully understood from the detailed description given hereinbelow and the accompanying drawings which are given by way of illustration only, and thus are not to be considered as limiting the present invention.

FIG. 3 is a diagram illustrating mobile terminal device information according to the first exemplary embodiment;

EXEMPLARY EMBODIMENTS

First Exemplary Embodiment

Figure 1:
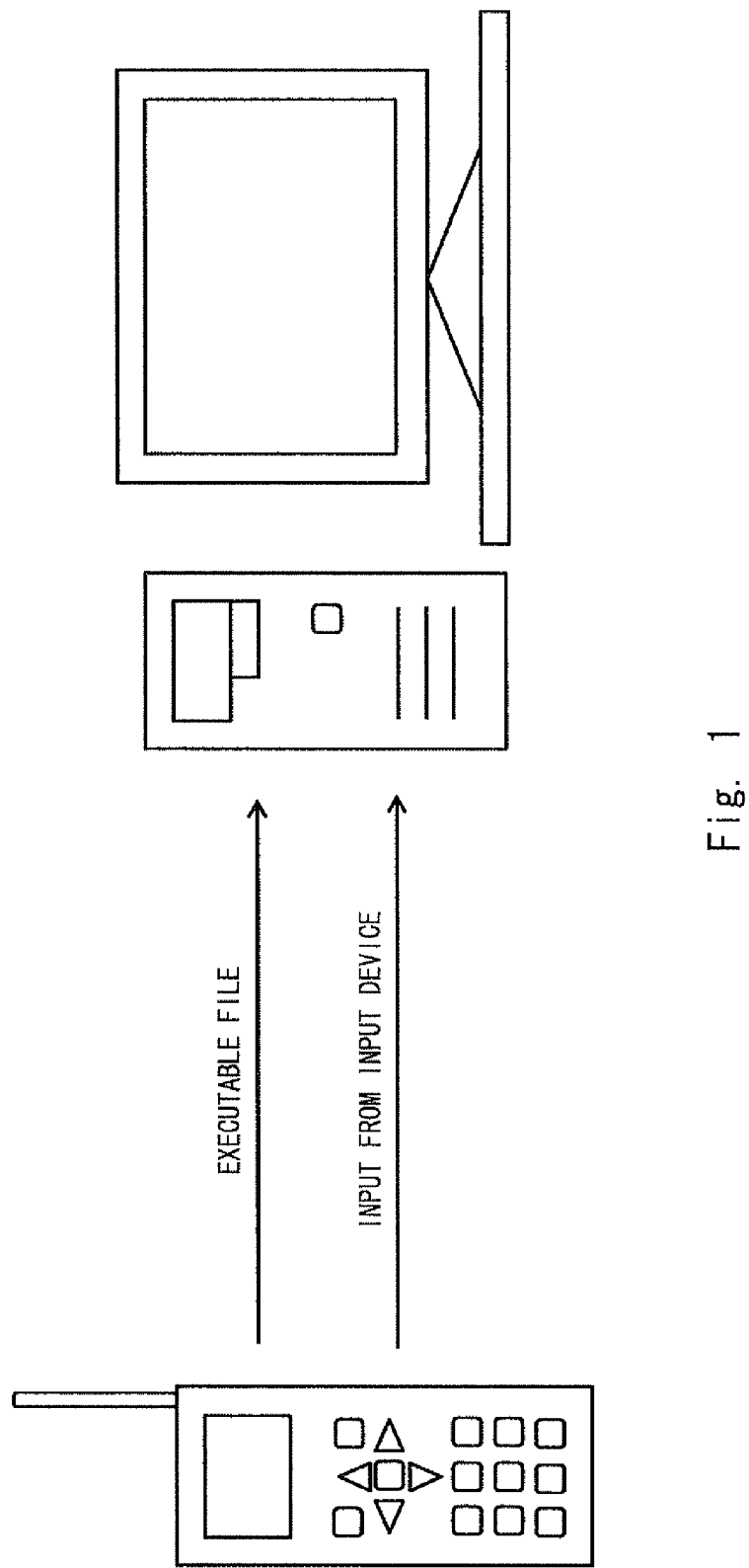
FIG. 1 is a schematic diagram of a communication system according to a first exemplary embodiment.

Hereinafter, exemplary embodiments of the present invention will be described with reference to the drawings. FIG. 1 is a schematic diagram illustrating a basic configuration of a communication system according to an exemplary embodiment of the present invention. The communication system includes a mobile terminal 10 and a PC (Personal Computer) 20.

The mobile terminal 10 is configured to be able to communicate with the PC 20 and other communication terminals via the Internet and other communication media. The mobile terminal 10 includes input devices such as a keyboard and a touch panel. Further, the mobile terminal 10 may be configured to receive a given input from a mouse or the like connected to a USB (Universal Serial Bus). Furthermore, the mobile terminal 10 may incorporate a sensing device, such as an acceleration sensor, and may be configured to be able to detect a motion or vibration of the main body of the mobile terminal 10.

Examples of the mobile terminal 10 include a mobile phone, a smartphone, a PHS (Personal Handy-phone System), and a PDA (Personal Data Assistance). In the following description, assume that the mobile terminal 10 is a mobile phone.

The PC 20 is a computer which is connected or integrated with a display device such as a liquid crystal display, and the computer may be a laptop computer or a desktop computer. The PC 20 is configured to be able to communicate with the mobile terminal 10 and other communication terminals via the Internet and other communication media.

The PC 20 includes input devices, such as a keyboard and a mouse, which are integrated or externally connected with a USB or the like.

The mobile terminal 10 is configured to be able to transfer an application executable file and an input from each input device to the PC 20. The details thereof will be described later. The following description is made assuming that the mobile terminal 10 and the PC 20 are computers that can execute JAVA® applications.

Application program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as an electric wire or an optical fiber, or a wireless communication line.

Figure 2:
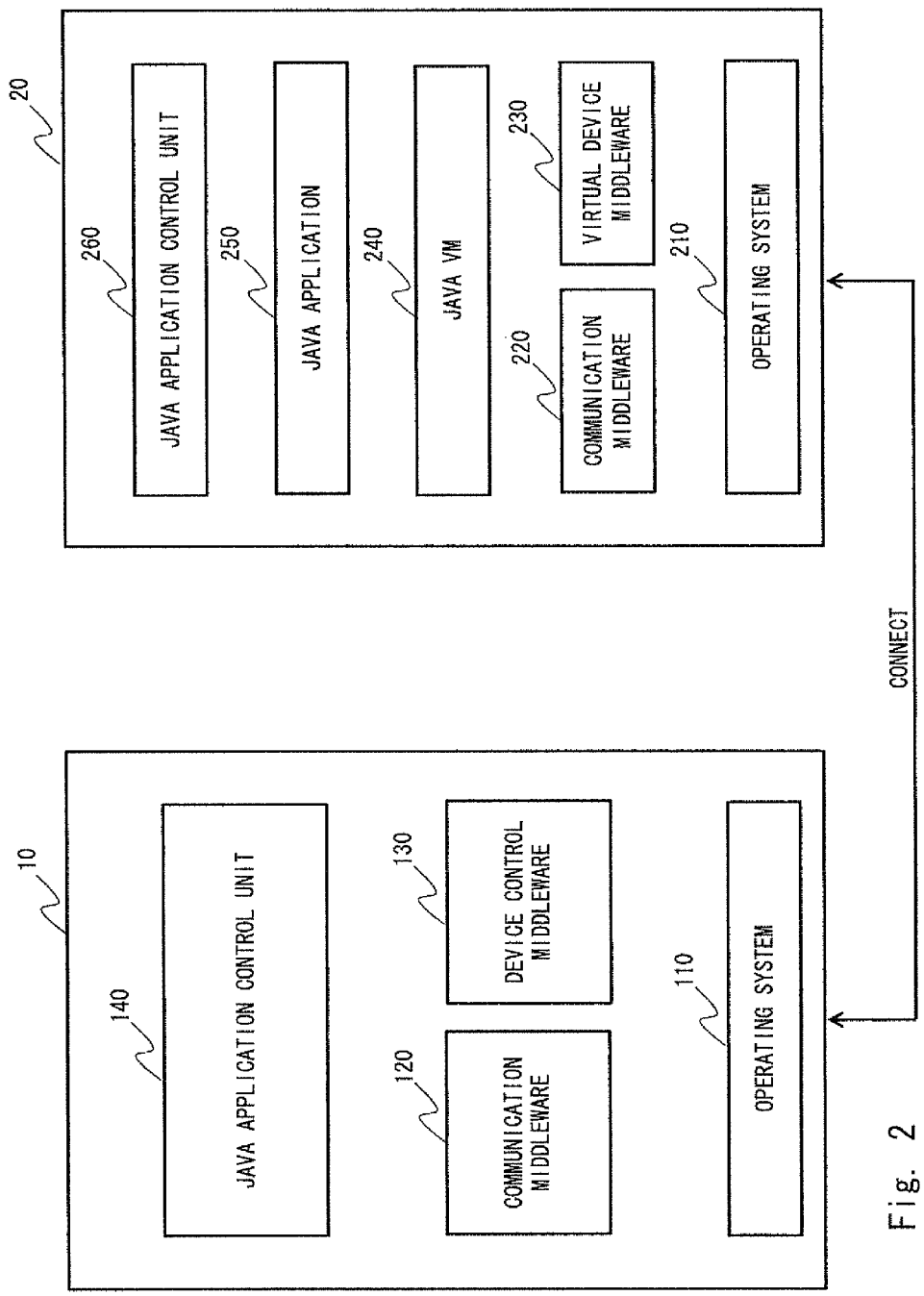
FIG. 2 is a block diagram illustrating a detailed configuration of the communication system according to the first exemplary embodiment.

FIG. 2 is a block diagram illustrating a detailed configuration of the communication system according to this exemplary embodiment. Although not illustrated, the mobile terminal 10 and the PC 20 are computers including a central processing unit (CPU), and include a main memory, a hard disk, and the like.

The mobile terminal 10 includes an operating system (OS) 110, a communication middleware 120, a device control middleware 130, and a JAVA application control unit 140.

The operating system 110 is so-called basic software that controls the overall mobile terminal 10.

The communication middleware 120 is software for establishing communication between the PC 20 and other communication terminals. The communication middleware 120 controls transmission and reception of data via a protocol such as TCP/IP (Transmission Control Protocol/Internet Protocol) or UDP (User Datagram Protocol).

The device control middleware 130 analyzes the input from each input device included in the mobile terminal 10. Examples of the input device include operation keys including numeric keys, a touch panel, and various sensing devices (an acceleration sensor, an acoustic wave sensor). The device control middleware 130 converts input information (for example, information indicating that a key "3" is pressed for five seconds) from each input device and ability information (for example, information indicating the type of input devices to be held, or the type of operation keys included) of each input device included in the mobile terminal 10 into appropriate information so that the information can be treated in the PC 20, for example, and then transmits the converted information. Note that the input information from each input device and the ability information of each input device included in the mobile terminal 10 are hereinafter referred to as "mobile terminal device information".

The JAVA application control unit 140 transmits activation information and classpath information on the application to the PC 20 according to an application activation instruction from a user. Further, the JAVA application control unit 140 transmits an executable file requested from the PC 20 to the PC 20.

The term "activation information" herein described refers to information for specifying an application executable file (i.e., execution class) and information on various parameters that are necessary upon activation of an application. Assuming that the activation information is configured to include a previous application execution history, it is also possible to resume the application from the previous execution state of the application. For example, an application for a role playing game can be resumed from the previous execution state.

Next, the configuration of the PC 20 will be described. The PC 20 includes an operating system (OS) 210, a communication middleware 220, a virtual device control middleware 230, a JAVA VM 240, a JAVA application 250, and a JAVA application control unit 260.

The operating system 210 is basic software for controlling the PC 20.

The communication middleware 220 is software for establishing communication between the PC 20 and other communication terminals. The communication middleware 220 controls transmission and reception of data via a protocol such as TCP/IP or UDP.

The virtual device middleware 230 receives the mobile terminal device information transmitted from the device control middleware 130 of the mobile terminal 10, and emulates the information (i.e., analyzes the information and converts the information into a form that can be input to an application) so that the information can be input to the JAVA application 250. The virtual device middleware 230 supplies the emulated information as input information (event information) of the JAVA application 250. Further, the virtual device middleware 230 meditates the input from each input device of the PC 20 and supplies the input to the JAVA application 250.

Note that the input from each input device (for example, a keyboard) connected to the PC 20 is supplied to the JAVA application 250, as needed, in the initial state. In other words, each input device of the mobile terminal 10 and each input device of the PC 20 can be used for application operation.

An example of exchanging information between the device control middleware 130 and the virtual device control middleware 230 will now be described. The device control middleware 130 generates the mobile terminal device information according to a predetermined data format.

FIG. 3 illustrates an example of the mobile terminal device information that is transmitted to the virtual device control middle ware 230 by the device control middleware 130. Referring FIG. 3, the mobile terminal device information includes the modular type of the mobile terminal 10, identification information (MAC (Media Access Control) address), an available input device, an input device (using device) used for application operation, detailed information (device information) on the input device, and input information from the input device. The virtual device control middleware 230 analyzes the information, and converts the information into a form that can be input to an application. The device control middleware 130 transmits the mobile terminal device information every time there is an input from each input device of the mobile terminal 10.

Note that the mobile terminal device information shown in FIG. 3 is illustrated by way of example only. Other data formats and other items may be described, as a matter of course. For example, information indicating that a certain input device of the PC 20 is to be invalidated may also be included. Specifically, when a keyboard is present as an input device in each of the mobile terminal 10 and the PC 20, information indicating that the keyboard of the PC 20 is to be invalidated may be included. In this case, the virtual device control middleware 230 controls all inputs from the keyboard of the PC 20 to be invalidated, instead of inputting the inputs from the keyboard of the PC 20 directly to the JAVA application 250.

Further, the device control middleware 130 may transmit only the identification information (MAC (Media Access Control) address) and the input information from the input device. In this case, if the other information is the same as that obtained during the previous communication, the communications traffic can be reduced.

The JAVA VM (Virtual Machine) 240 is a stack-type virtual machine (software for causing a computer to execute virtualized resources such as a CPU and a storage device of the computer) that executes an instruction set defined as JAVA bytecode. The JAVA VM 240 holds a function equivalent to VM (not illustrated) of JAVA running on the mobile terminal 10 (i.e., a standard executable file).

The JAVA application 250 is an application desired to be executed by the user. The JAVA application 250 is software executed by an executable file (class file) acquired from the mobile terminal 10 and by an executable file (class file) preliminarily held in the PC 20. The execution state of the application is sequentially displayed on the liquid crystal display included in the PC 20.

The JAVA application control unit 260 searches and acquires a group of necessary executable files according to the application activation instruction from the mobile terminal 10. Further, the JAVA application control unit 260 receives the activation information and classpath information, which are required upon execution of the application, from the mobile terminal 10. The JAVA application control unit 260 performs processing for starting execution of the application after acquisition of the executable file and activation information necessary for execution of the application.

Figure 4:
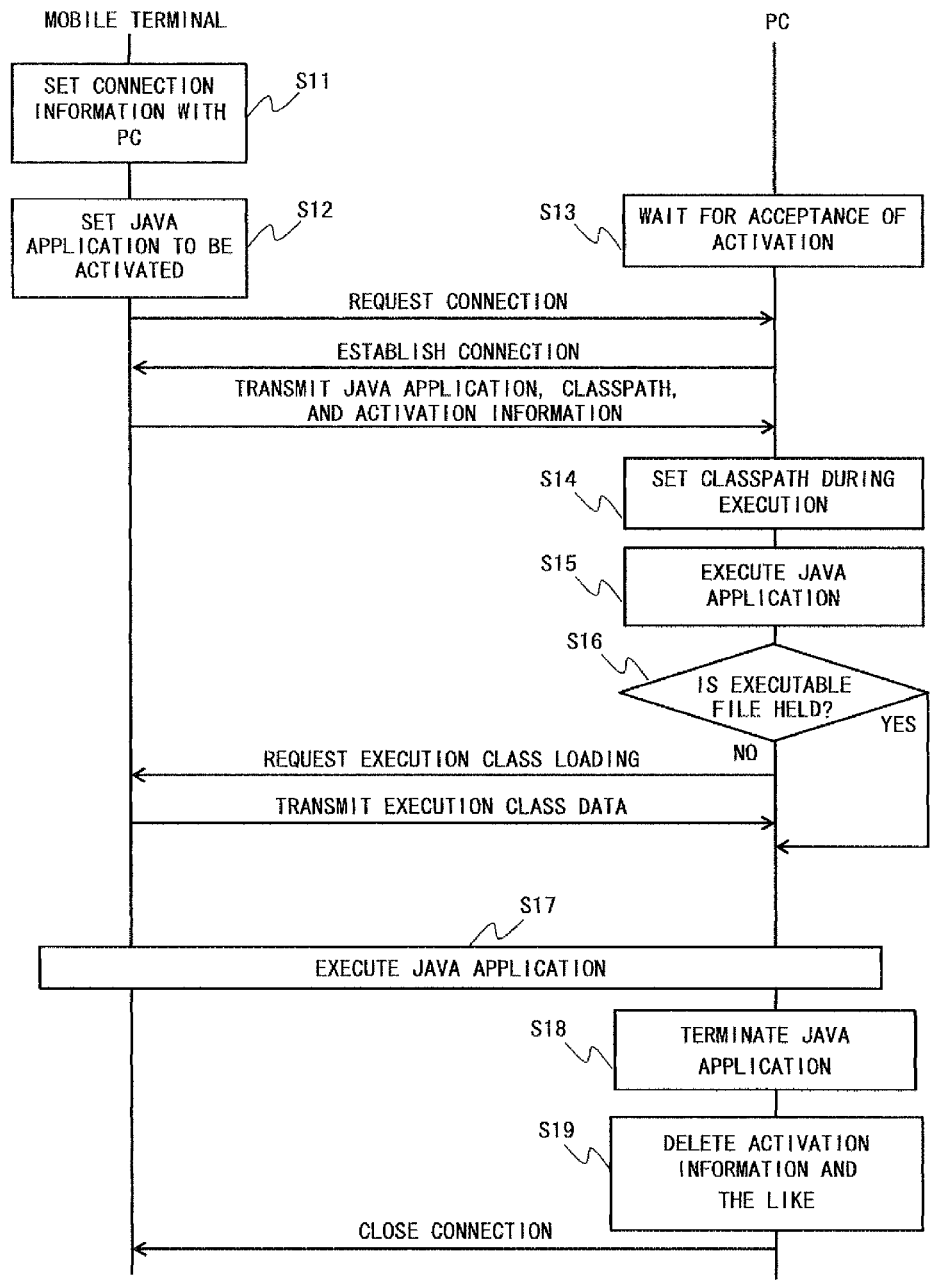
FIG. 4 is a sequence diagram illustrating a flow of processing during execution of an application executable in a mobile terminal 10 on a PC 20 according to the first exemplary embodiment.

Next, processing for activating an application by the communication system according to this exemplary embodiment will be described. FIG. 4 is a sequence diagram illustrating a flow of processing during execution of an application executable in the mobile terminal 10 on the PC 20.

The mobile terminal 10 sets connection information (for example, the IP address of the PC 20) for establishing a connection with the PC 20, thereby allowing the mobile terminal 10 to be connectable with the PC 20 at any time (S11). Subsequently, the JAVA application control unit 140 sets the application to be activated according to an input of the user (S12). On the other hand, the PC 20 is set to be ready for communication processing with the mobile terminal 10 (S13).

The communication middleware 120 establishes a connection with the PC 20 via a communication protocol, such as TPC/IP, according to an input of an application activation request from the user. After the establishment of the connection, the JAVA application control unit 140 transmits the classpath and activation information for the application to be activated.

The JAVA application control unit 260 sets the received classpath (S14). The term "classpath" herein described refers to information for designating a search position of an executable file (class file) during execution of an application. The classpath also indicates information used during acquisition of an executable file (class file) from the mobile terminal 10.

The JAVA application control unit 260 tries to execute the application by referring to the received activation information (S15). In this case, when it is determined that executable files (class files) necessary for execution of the application are insufficient (S16: No), the JAVA application control unit 260 acquires a necessary executable file (class file) from the mobile terminal 10.

When the application is executed on the PC 20 (S17) and a termination notification from the user is accepted, the JAVA application control unit 260 performs application termination processing (S18). Then, the JAVA application control unit 260 deletes all information acquired from the mobile terminal 10, i.e., the activation information, the executable file information, the mobile terminal device information, and the like. The deletion of the information prevents the information with high confidentiality from being continuously held in the PC 20.

Note that the deletion of the executable file and the like may be omitted, if the mobile terminal 10 and the PC 20 are owned by the same user, for example. This leads to a reduction in the number of transmissions of executable files and a reduction in the activation time.

Lastly, the PC 20 interrupts the connection with the mobile terminal 10.

Figure 5:
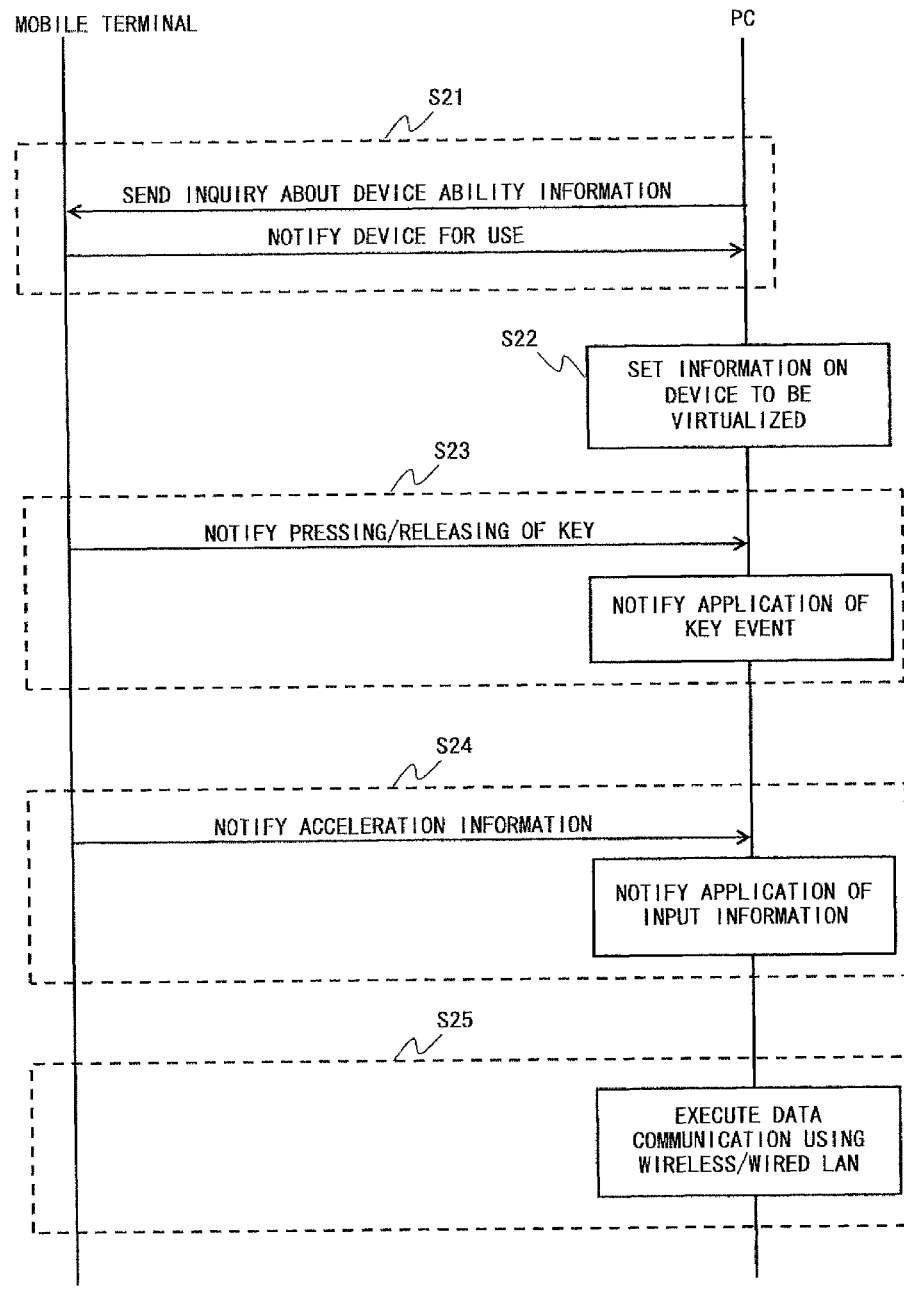
FIG. 5 is a sequence diagram illustrating processing for input control using an input device of the mobile terminal 10 during execution of an application on the PC 20 according to the first exemplary embodiment.

Next, a description is given of the input control using each input device of the mobile terminal 10 during execution of an application on the PC 20. FIG. 5 is a sequence diagram illustrating processing for the input control using each input device of the mobile terminal 10 during execution of an application on the PC 20.

The PC 20 periodically sends an inquiry to the mobile terminal 10 about which input device is held, and which input device is used during execution of an application, for example. The mobile terminal 10 notifies the PC 20 of the input device to be used during execution of the application. The notification is transmitted by the mobile terminal device information described above, for example.

The virtual device control middleware 230 performs various settings for accepting inputs from each input device of the designated mobile terminal 10 (S22).

When the key input of the mobile terminal 10 is validated and the key is operated, the device control middleware 130 notifies the PC 20 of the key operation. The virtual device control middleware 230 emulates the received information and uses the emulated information as input information of the application (S23).

When the input of the acceleration sensor of the mobile terminal 10 is validated and the acceleration sensor detects an operation, the device control middleware 130 notifies the PC 20 of acceleration information. The virtual device control middleware 230 emulates the received information and uses the emulated information as input information of the application (S24). When the communication device is not virtualized, data communication is carried out as needed by using a communication line such as a wireless or wired LAN built in the PC 20 (S25). Steps S21 to S25 described above are steps to be carried out in random order, and some processing may be repeatedly carried out. Although not illustrated, the virtual device control middleware also controls the input from each input device on the PC 20 as an input to the application, as needed.

Subsequently, an advantageous effect of the communication system according to this exemplary embodiment will be described. In the communication system described above, the application to be executed by the mobile terminal 10, as well as the input from each input device connected or integrated with the mobile terminal 10, is transmitted to the PC 20. The PC 20 converts the input from the mobile terminal 10 into event information of the application and uses the converted information as an input to the application. This allows the user to perform the application operation by using each input device of the mobile terminal 10 and to display the application on the screen by using the display device (liquid crystal display) of the PC 20. Thus, the user who is familiar with the operation of each input device of the mobile terminal 10 can effectively operate an application. Further, the user can use the input devices, which are included only in the mobile terminal 10, for the application operation, while viewing the display device of the PC 20.

Furthermore, both the input devices of the PC 20 and the mobile terminal 10 can be used for application operation, which drastically improves the operability for the user.

Note that the present invention is not limited to exemplary embodiments described above. The elements of exemplary embodiments described above may be modified, added, or converted into the content that can be easily understood by those skilled in the art within the scope of the present invention.

For example, the above description has been made on the premise that JAVA applications are executed, but the present invention is not limited thereto. The present invention can be applied to an operation using each input device of a mobile terminal by referring to a given application on a screen of a PC.

Figure 6:
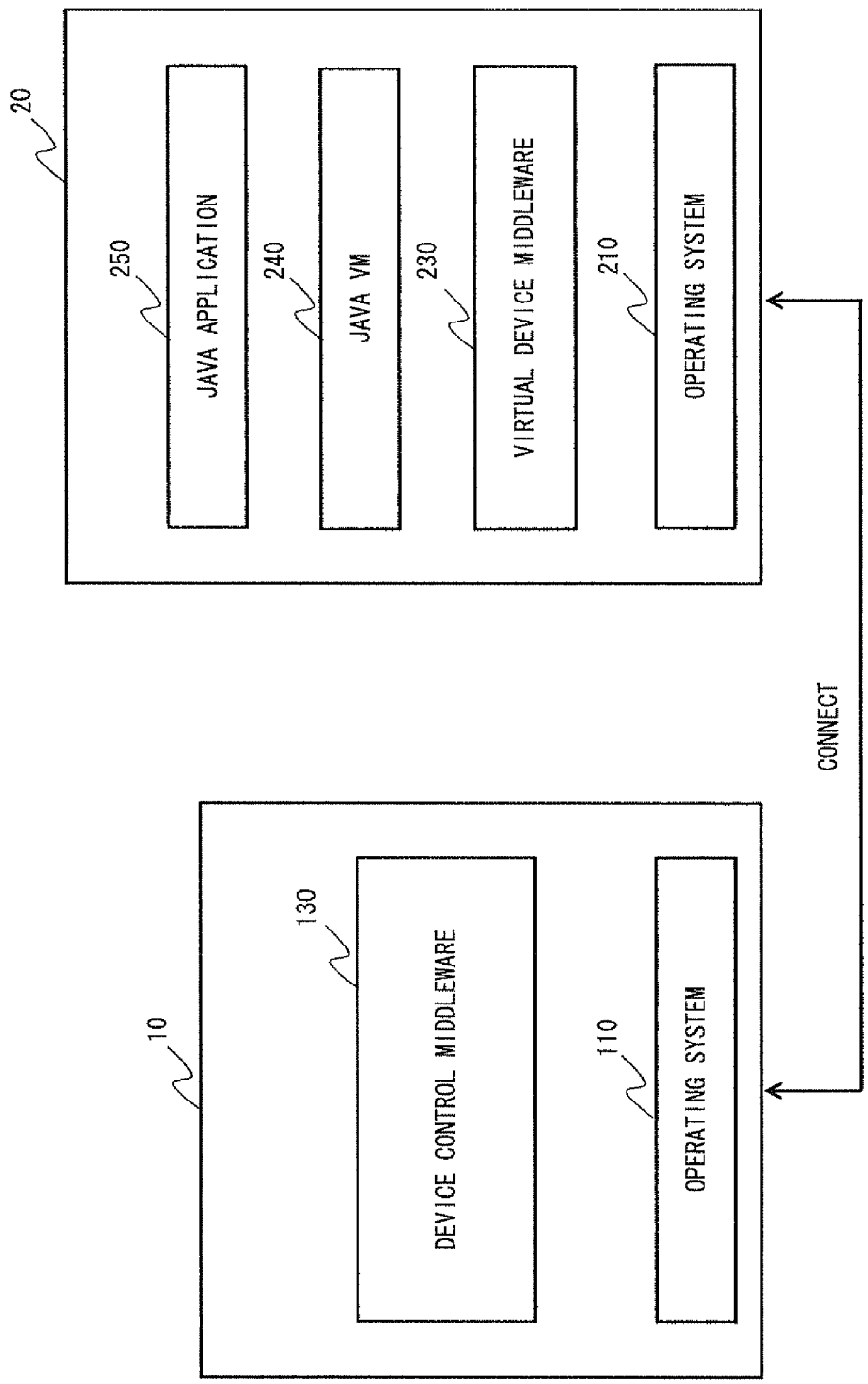
FIG. 6 is a block diagram illustrating the configuration of the communication system according to the first exemplary embodiment.

FIG. 6 illustrates a diagram in which essential components of this exemplary embodiment are specified. The device control middleware 130 in the mobile terminal 10 converts the ability information and input information (for example, pressing of a key) of various input devices of the mobile terminal 10 into an analyzable form, and transmits the converted information to the PC 20. The virtual device middleware 230 in the PC 20 analyzes the information received from the device control middleware 130, and supplies the information extracted by the analysis as input information of the JAVA application 250. This allows the user to operate the application running on the PC 20 by using various input devices of the mobile terminal 10.

The whole or part of the exemplary embodiments disclosed above can be described as, but not limited to, the following supplementary notes.

(Supplementary Note 1)

A communication system including:

a mobile terminal including at least one first input device through which a user performs a given input; and an information processing apparatus that executes a given application and displays an execution state of the application on a display device, the information processing apparatus being connected or integrated with the display device, wherein the mobile terminal includes a device control middleware unit that transmits, to the information processing apparatus, ability information of the first input device and an input from the first input device, and the information processing apparatus includes a virtual device control middleware unit that emulates the information received from the device control middleware unit as an input to the application.

(Supplementary Note 2)

The communication system as set forth in Supplementary note 1, wherein the information processing apparatus includes at least one second input device through which a user performs a given input, and the virtual device control middleware unit selectively sets an input from the first input device and an input from the second input device as an input to the application.

(Supplementary Note 3)

The communication system as set forth in Supplementary note 1 or 2, wherein the information processing apparatus deletes all information received from the mobile terminal, upon termination of the execution of the application.

(Supplementary Note 4)

The communication system as set forth in Supplementary note 2 or 3, wherein the first input device or the second input device is one of a touch panel, a keyboard, and a sensing device.

(Supplementary Note 5)

The communication system as set forth in any one of Supplementary notes 1 to 4, wherein the application is a JAVA® application.

(Supplementary Note 6)

A mobile terminal including at least one first input device through which a user performs a given input, the mobile terminal being configured to execute a given application and to transmit, to an information processing apparatus, ability information of the first input device and an input from the first input device, as an operation instruction for the application, the information processing apparatus being configured to display an execution state of the application on a display device.

(Supplementary Note 7)

The mobile terminal as set forth in Supplementary note 6, wherein the first input device is one of a touch panel, a keyboard, and a sensing device.

(Supplementary Note 8)

The mobile terminal as set forth in Supplementary note 6 or 7, wherein the application is a JAVA® application.

(Supplementary Note 9)

An information processing apparatus that executes a given application and displays an execution state of the application on a display device, the information processing apparatus being connected or integrated with the display device, the information processing apparatus being configured to:

receive ability information of a first input device and an input from the first input device, as an operation instruction for the application, the first input device being connected or integrated with a mobile terminal; and emulate the received information as an input to the application.

(Supplementary Note 10)

The information processing apparatus as set forth in Supplementary note 9, wherein the information processing apparatus includes at least one second input device through which a user performs a given input, and the information processing apparatus selectively sets an input from the first input device and an input from the second input device as an input to the application.

(Supplementary Note 11)

The information processing apparatus as set forth in Supplementary note 9 or 10, wherein the information processing apparatus deletes all information received from the mobile terminal, upon termination of the execution of the application.

(Supplementary Note 12)

The information processing apparatus according to any one of Supplementary note 10 or 11, wherein the first input device or the second input device is one of a touch panel, a keyboard, and a sensing device.

(Supplementary Note 13)

The information processing apparatus as set forth in any one of Supplementary notes 9 to 12, wherein the application is a JAVA® application.

(Supplementary Note 14)

An input method for inputting an operation instruction to an application in a communication system including: a mobile terminal including at least one first input device through which a user performs a given input; and an information processing apparatus that executes a given application and displays an execution state of the application on a display device, the information processing apparatus being connected or integrated with the display device, the method including:

transmitting, by the mobile terminal, ability information of the first input device and an input from the first input device, to the information processing apparatus; and emulating, by the information processing apparatus, the ability information of the first input device and the input from the first input device, as an input to the application, the ability information and the input being received from the mobile terminal.

According to the present invention, it is possible to provide a communication system, a mobile terminal, and an input method, which are capable of executing an application on a mobile terminal by using an input unit which can be easily used by a user.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A communication system including:

a mobile terminal including at least one first input device through which a user performs a given input; and an information processing apparatus that executes a given application and displays an execution state of the application on a display device, the information processing apparatus being connected or integrated with the display device, wherein:

the mobile terminal includes a device control middleware unit that transmits, to the information processing apparatus, ability information of the first input device and an input from the first input device, the information processing apparatus includes at least one second input device through which the user performs a given input, and a virtual device control middleware unit that selectively sets an input from the first input device and an input from the second input device as an input to the application;

an application control unit transmits activation information on the application according to an application activation instruction from the user; and the virtual device control middleware analyzes the ability information and the activation information, and converts the ability information and the activation information into a form that can be input to the application, thereby allowing the user to operate the application by using various inputs.

2. The communication system according to claim 1, wherein the application control unit is a Java application control unit; and the Java application control unit transmits activation information and class path information on the application according to an application activation instruction from the user.

3. The communication system according to claim 1, wherein the information processing apparatus deletes all information received from the mobile terminal, upon termination of the execution of the application.

4. The communication system according to claim 1, wherein the first input device or the second input device is one of a touch panel, a keyboard, and a sensing device.

5. An information processing apparatus that executes a given application and displays an execution state of the application on a display device, the information processing apparatus being connected or integrated with the display device, the information processing apparatus being configured to:

receive ability information of a first input device and an input from the first input device, as an operation instruction for the application, the first input device being connected or integrated with a mobile terminal;

wherein:

the information processing apparatus includes at least one second input device through which a user performs a given input, and a virtual device control middleware unit selectively sets an input from the first input device and an input from the second input device as an input to the application;

an application control unit transmits activation information on the application according to an application activation instruction from the user; and the virtual device control middleware analyzes the ability information and the activation information, and converts the ability information and the activation information into a form that can be input to the application, thereby allowing the user to operate the application by using various inputs.

6. The information processing apparatus according to claim 5, wherein:

the application control unit is a Java application control unit; and the Java application control unit transmits activation information and class path information on the application according to the application activation instruction from the user.

7. The information processing apparatus according to claim 5, wherein the information processing apparatus deletes all information received from the mobile terminal, upon termination of the execution of the application.

8. An input method for inputting an operation instruction to an application in a communication system including: a mobile terminal including at least one first input device through which a user performs a given input; and an information processing apparatus that executes a given application and displays an execution state of the application on a display device, the information processing apparatus being connected or integrated with the display device, the method comprising:

transmitting, by the mobile terminal, activation information on the application according to the application activation instruction from the user;

transmitting, by the mobile terminal, ability information of the first input device and an input from the first input device, to the information processing apparatus;

analyzing, by the information processing apparatus, the activation information and the ability information; and converting, by the information processing apparatus, the activation information and the ability information into a form that can be input to the application, thereby allowing the user to operate the application by using various inputs.

* * * * *